United States Patent
Cunningham et al.

(10) Patent No.: US 11,651,278 B2
(45) Date of Patent: May 16, 2023

(54) PIPELINE SENSOR INTEGRATION FOR PRODUCT MAPPING

(71) Applicant: Saudi Arabian Oil Company, Dhahran (SA)

(72) Inventors: Vincent Cunningham, Thuwal (SA); Ahmad Aldabbagh, Thuwal (SA); Sahejad Patel, Thuwal (SA); Wesam Hussain, Saihat (SA)

(73) Assignee: Saudi Arabian Oil Company, Dhahran (SA)

( * ) Notice: Subject to any disclaimer, the term of this patent is extended or adjusted under 35 U.S.C. 154(b) by 537 days.

(21) Appl. No.: 16/725,414

(22) Filed: Dec. 23, 2019

(65) Prior Publication Data
US 2021/0192388 A1 Jun. 24, 2021

(51) Int. Cl.
*G06N 20/00* (2019.01)
*G05D 7/06* (2006.01)
(Continued)

(52) U.S. Cl.
CPC ............... *G06N 20/00* (2019.01); *F17D 3/00* (2013.01); *F17D 3/03* (2013.01); *F17D 3/05* (2013.01);
(Continued)

(58) Field of Classification Search
CPC . Y10T 137/0452; G01M 3/00; G05D 7/0623; G06N 5/04; G06N 5/01;
(Continued)

(56) References Cited

U.S. PATENT DOCUMENTS 2,859,757 A * 11/1958 Parsons ................... F16L 55/00
137/93
3,531,255 A * 9/1970 Pasik ..................... G01N 21/72
236/15 E
(Continued)

FOREIGN PATENT DOCUMENTS

| WO | 2019040125 A1 | 2/2019 |
| WO | 2019108986 A1 | 6/2019 |

OTHER PUBLICATIONS

International Search Report and Written Opinion in Corresponding PCT Application No. PCT/US2020/066324 dated Mar. 23, 2021. 11 pages.

*Primary Examiner* — William M McCalister
(74) *Attorney, Agent, or Firm* — Leason Ellis LLP (57) ABSTRACT

An automated method of pipeline sensor integration for product mapping of a pipeline network is provided. The method includes acquiring, by a plurality of sensors of the pipeline network, first sensor responses of a pipeline in the pipeline network when a first hydrocarbon product is flowing through the pipeline. The method further includes using a prediction circuit to receive the acquired first sensor responses, integrate the received first sensor responses into one or more integrated first sensor responses in order to improve accuracy of the received first sensor responses, and identify the first hydrocarbon product in the pipeline based on the integrated first sensor responses. The prediction circuit is built from training data using a machine learning process. The training data includes first training sensor responses of the pipeline by the plurality of sensors acquired at a previous time when the first hydrocarbon product was flowing through the pipeline.

22 Claims, 6 Drawing Sheets

(51) Int. Cl.
*G06N 5/04* (2023.01)
*F17D 3/05* (2006.01)
*F17D 3/00* (2006.01)
*F17D 3/03* (2006.01)
*G01M 3/00* (2006.01)

(52) U.S. Cl.
CPC ............ *G01M 3/00* (2013.01); *G05D 7/0623* (2013.01); *G06N 5/04* (2013.01)

(58) Field of Classification Search
CPC ........ G06N 20/00; G06N 20/10; G06N 20/20; G06N 3/044; G06N 3/045; F17D 3/00; F17D 3/03; F17D 3/05; F17D 5/02
USPC ...................................................... 137/15.11
See application file for complete search history.

(56) References Cited

U.S. PATENT DOCUMENTS

| | | | | |
|---|---|---|---|---|
| 3,533,745 A * | 10/1970 | Fenske | ............... | G01N 33/2829 436/160 |
| 3,538,748 A * | 11/1970 | Linsell | ................... | G01M 3/02 73/61.61 |
| 4,397,958 A * | 8/1983 | Vroom | ............... | G01N 33/2829 422/62 |
| 5,272,646 A * | 12/1993 | Farmer | ............... | G01M 3/2807 73/40.5 R |
| 6,182,505 B1 * | 2/2001 | Segeral | ................ | G01N 1/2035 422/68.1 |
| 6,966,326 B2 * | 11/2005 | Murray | ................ | G05D 11/131 422/62 |
| 8,620,602 B2 * | 12/2013 | Alonso | ...................... | F17D 5/06 702/52 |
| 9,097,605 B2 * | 8/2015 | Calvanese Strinati | . | G01M 3/18 |
| 9,599,531 B1 | 3/2017 | Chaudhary et al. | | |
| 10,430,725 B2 | 10/2019 | Andersen et al. | | |
| 2005/0042034 A1 * | 2/2005 | Bose | ....................... | G01M 3/00 405/129.5 |
| 2009/0322544 A1 | 12/2009 | McDowell | | |
| 2011/0046903 A1 * | 2/2011 | Franklin | ............. | G01M 3/2815 702/51 |
| 2013/0289899 A1 * | 10/2013 | Tolton | ...................... | G01M 3/38 702/51 |
| 2013/0291974 A1 * | 11/2013 | Bourgeois | ................. | F17D 5/02 137/625.3 |
| 2014/0305517 A1 * | 10/2014 | Adler | .................... | G01M 3/243 137/312 |
| 2015/0192488 A1 * | 7/2015 | Xu | ........................... | G01M 3/00 348/81 |
| 2017/0268954 A1 * | 9/2017 | Ocalan | ................... | H04W 84/18 |
| 2018/0023768 A1 * | 1/2018 | Robbins | ................ | G05D 7/0635 137/2 |
| 2018/0143047 A1 * | 5/2018 | Gal | ........................ | G06Q 20/145 |
| 2018/0217056 A1 * | 8/2018 | Massie | ............... | G01N 21/3518 |
| 2018/0284735 A1 * | 10/2018 | Celia | ....................... | G06N 5/046 |
| 2018/0347763 A1 | 12/2018 | Ford et al. | | |
| 2019/0331301 A1 | 10/2019 | Du et al. | | |

* cited by examiner

Start
↓
Acquire sensor responses of pipeline in pipeline network from sensors when hydrocarbon product is flowing through pipeline
610
↓
Receive acquired sensor responses at prediction circuit
620
↓
Integrate received sensor responses into one or more integrated sensor responses in order to improve accuracy of received sensor responses
630
↓
Identify hydrocarbon product in pipeline based on integrated sensor responses
640
↓
Predict arrival time of hydrocarbon product at group of one or more valves of pipeline network based on integrated sensor responses
650
↓
Control valve group to first position at predicted arrival time based on identified hydrocarbon product
660
↓
End

PIPELINE SENSOR INTEGRATION FOR PRODUCT MAPPING

FIELD OF THE DISCLOSURE

The present disclosure relates generally to a machine learning approach for integration of various sensors of a pipeline network. Some specific embodiments relate to a machine learning technique to integrate the various sensors of the pipeline network in order to autonomously map or manage one or more products being transported through the pipeline network.

BACKGROUND OF THE DISCLOSURE

A pipeline transportation network for hydrocarbons is a complex interconnected collection of pipes, connections, valves, and the like, operating in a large area and subject to many influences such as environmental, chemical, and mechanical, to name a few. Often, numerous products (such as numerous liquid hydrocarbon products) share the pipeline network, each product occupying a particular portion of the pipeline network during a particular time as the product is transported through the pipeline network. Each different element or aspect of the pipeline network and its operation affects the corresponding flows of the hydrocarbons. Additionally, abnormal or unexpected behavior of the pipeline network due to integrity issues such as leaks, defective valves, or the like, also affects the flow rates and product mixing (e.g., in multiproduct pipeline networks). As a result, both mapping the hydrocarbon product transportation in real time and predicting the behavior and location of different hydrocarbon products in a pipeline network is not a straightforward task.

It is in regard to these and other problems in the art that the present disclosure is directed to provide a technical solution for an effective pipeline sensor integration technique for product mapping.

SUMMARY OF THE DISCLOSURE

According to an embodiment, an automated method of pipeline sensor integration for product mapping of a pipeline network is provided. The method comprises: acquiring, by a plurality of sensors of the pipeline network, first sensor responses of a pipeline in the pipeline network when a first hydrocarbon product is flowing through the pipeline; receiving, by a prediction circuit, the acquired first sensor responses; integrating, by the prediction circuit, the received first sensor responses into one or more integrated first sensor responses in order to improve accuracy of the received first sensor responses; and identifying, by the prediction circuit, the first hydrocarbon product in the pipeline based on the integrated first sensor responses. The prediction circuit is built from training data using a machine learning process. The training data comprises first training sensor responses of the pipeline by the plurality of sensors acquired at a previous time when the first hydrocarbon product was flowing through the pipeline.

In an embodiment, the method further comprises: detecting, by the prediction circuit, a leak in the pipeline based on the integrated first sensor responses; and alerting, by the prediction circuit, an operator of the pipeline network about the detected leak.

In an embodiment, the method further comprises: predicting, by the prediction circuit, a first arrival time of the first hydrocarbon product at a group of one or more valves of the pipeline network based on the integrated first sensor responses, the valve group being for directing hydrocarbon products in the pipeline network to their corresponding destinations; and controlling, by the prediction circuit, the valve group to a first position at the predicted first arrival time based on the identified first hydrocarbon product.

In an embodiment, the method further comprises: predicting, by the prediction circuit, an arrival time of the first hydrocarbon product at a location in the pipeline network based on the integrated first sensor responses; and alerting, by the prediction circuit, an operator of the pipeline network about the predicted arrival time.

In an embodiment, the method further comprises: acquiring, by the plurality of sensors, second sensor responses of the pipeline when a second hydrocarbon product is flowing through the pipeline following the first hydrocarbon product; receiving, by the prediction circuit, the acquired second sensor responses; integrating, by the prediction circuit, the received second sensor responses into one or more integrated second sensor responses in order to improve accuracy of the received second sensor responses; and identifying, by the prediction circuit, the second hydrocarbon product in the pipeline based on the integrated second sensor responses, wherein the second hydrocarbon product is different than the first hydrocarbon product, and the training data further comprises second training sensor responses of the pipeline by the plurality of sensors acquired at a previous time when the second hydrocarbon product was flowing through the pipeline.

In an embodiment, the method further comprises: predicting, by the prediction circuit, a first arrival time of the first hydrocarbon product at a group of one or more valves of the pipeline network based on the integrated first sensor responses, the valve group being for directing hydrocarbon products in the pipeline network to their corresponding destinations; controlling, by the prediction circuit, the valve group to a first position at the predicted first arrival time based on the identified first hydrocarbon product; predicting, by the prediction circuit, a second arrival time of the second hydrocarbon product at the valve group based on the integrated second sensor responses; and controlling, by the prediction circuit, the valve group to a second position at the predicted second arrival time based on the identified second hydrocarbon product, the second position being different than the first position.

In an embodiment, both receiving the acquired first sensor responses and receiving the acquired second sensor responses comprise using the Industrial Internet of Things (IIoT), and both controlling the valve group to the first position and controlling the valve group to the second position comprise using the IIoT.

In an embodiment, the method further comprises: acquiring, by the plurality of sensors, third sensor responses of the pipeline when a mixture of the first and second hydrocarbon products is flowing through the pipeline following the first hydrocarbon product and preceding the second hydrocarbon product; receiving, by the prediction circuit, the acquired third sensor responses; integrating, by the prediction circuit, the received third sensor responses into one or more integrated third sensor responses in order to improve accuracy of the received third sensor responses; and identifying, by the prediction circuit, the mixture of the first and second hydrocarbon products in the pipeline based on the integrated third sensor responses.

In an embodiment, the method further comprises: detecting, by the prediction circuit, a product change in the pipeline based on the identified first hydrocarbon product, the identified second hydrocarbon product, and the identified mixture of the first and second hydrocarbon products; and alerting, by the prediction circuit, an operator of the pipeline network about the detected product change.

In an embodiment, the method further comprises: predicting, by the prediction circuit, a first arrival time of the first hydrocarbon product at a group of one or more valves of the pipeline network based on the integrated first sensor responses, the valve group being for directing hydrocarbon products in the pipeline network to their corresponding destinations; controlling, by the prediction circuit, the valve group to a first position at the predicted first arrival time based on the identified first hydrocarbon product; predicting, by the prediction circuit, a third arrival time of the mixture of the first and second hydrocarbon products at the valve group based on the integrated third sensor responses; controlling, by the prediction circuit, the valve group to a third position at the predicted third arrival time based on the identified mixture of the first and second hydrocarbon products, the third position being different than the first position; predicting, by the prediction circuit, a second arrival time of the second hydrocarbon product at the valve group based on the integrated second sensor responses; and controlling, by the prediction circuit, the valve group to a second position at the predicted second arrival time based on the identified second hydrocarbon product, the second position being different than the first and third positions.

According to another embodiment, a system of automated pipeline sensor integration for product mapping of a pipeline network is provided. The system comprises: a plurality of sensors configured to acquire first sensor responses of a pipeline in the pipeline network when a first hydrocarbon product is flowing through the pipeline; and a prediction circuit. The prediction circuit is configured to: receive the acquired first sensor responses; integrate the received first sensor responses into one or more integrated first sensor responses in order to improve accuracy of the received first sensor responses; and identify the first hydrocarbon product in the pipeline based on the integrated first sensor responses. The prediction circuit is built from training data using a machine learning process. The training data comprises first training sensor responses of the pipeline by the plurality of sensors acquired at a previous time when the first hydrocarbon product was flowing through the pipeline.

In an embodiment, the prediction circuit is further configured to: detect a leak in the pipeline based on the integrated first sensor responses; and alert an operator of the pipeline network about the detected leak.

In an embodiment, the prediction circuit is further configured to: predict a first arrival time of the first hydrocarbon product at a group of one or more valves of the pipeline network based on the integrated first sensor responses, the valve group being for directing hydrocarbon products in the pipeline network to their corresponding destinations; and control the valve group to a first position at the predicted first arrival time based on the identified first hydrocarbon product.

In an embodiment, the prediction circuit is further configured to: predict an arrival time of the first hydrocarbon product at a location in the pipeline network based on the integrated first sensor responses; and alert an operator of the pipeline network about the predicted arrival time.

In an embodiment, the plurality of sensors are further configured to acquire second sensor responses of the pipeline when a second hydrocarbon product is flowing through the pipeline following the first hydrocarbon product, and the prediction circuit is further configured to: receive the acquired second sensor responses; integrate the received second sensor responses into one or more integrated second sensor responses in order to improve accuracy of the received second sensor responses; and identify the second hydrocarbon product in the pipeline based on the integrated second sensor responses, wherein the second hydrocarbon product is different than the first hydrocarbon product, and the training data further comprises second training sensor responses of the pipeline by the plurality of sensors acquired at a previous time when the second hydrocarbon product was flowing through the pipeline.

In an embodiment, the prediction circuit is further configured to: predict a first arrival time of the first hydrocarbon product at a group of one or more valves of the pipeline network based on the integrated first sensor responses, the valve group being for directing hydrocarbon products in the pipeline network to their corresponding destinations; control the valve group to a first position at the predicted first arrival time based on the identified first hydrocarbon product; predict a second arrival time of the second hydrocarbon product at the valve group based on the integrated second sensor responses; and control the valve group to a second position at the predicted second arrival time based on the identified second hydrocarbon product, the second position being different than the first position.

In an embodiment, the prediction circuit is further configured to: both receive the acquired first sensor responses and receive the acquired second sensor responses by using the Industrial Internet of Things (IIoT); and both control the valve group to the first position and control the valve group to the second position by using the IIoT.

In an embodiment, the plurality of sensors are further configured to acquire third sensor responses of the pipeline when a mixture of the first and second hydrocarbon products is flowing through the pipeline following the first hydrocarbon product and preceding the second hydrocarbon product, and the prediction circuit is further configured to: receive the acquired third sensor responses; integrate the received third sensor responses into one or more integrated third sensor responses in order to improve accuracy of the received third sensor responses; and identify the mixture of the first and second hydrocarbon products in the pipeline based on the integrated third sensor responses.

In an embodiment, the prediction circuit is further configured to: detect a product change in the pipeline based on the identified first hydrocarbon product, the identified second hydrocarbon product, and the identified mixture of the first and second hydrocarbon products; and alert an operator of the pipeline network about the detected product change.

In an embodiment, the prediction circuit is further configured to: predict a first arrival time of the first hydrocarbon product at a group of one or more valves of the pipeline network based on the integrated first sensor responses, the valve group being for directing hydrocarbon products in the pipeline network to their corresponding destinations; control the valve group to a first position at the predicted first arrival time based on the identified first hydrocarbon product; predict a third arrival time of the mixture of the first and second hydrocarbon products at the valve group based on the integrated third sensor responses; control the valve group to a third position at the predicted third arrival time based on the identified mixture of the first and second hydrocarbon products, the third position being different than the first position; predict a second arrival time of the second hydrocarbon product at the valve group based on the integrated second sensor responses; and control the valve group to a second position at the predicted second arrival time based on the identified second hydrocarbon product, the second position being different than the first and third positions.

Any combinations of the various embodiments and implementations disclosed herein can be used. These and other aspects and features can be appreciated from the following description of certain embodiments together with the accompanying drawings and claims.

BRIEF DESCRIPTION OF THE DRAWINGS

It is noted that the drawings are illustrative and not necessarily to scale, and that the same or similar features have the same or similar reference numerals throughout.

DETAILED DESCRIPTION OF CERTAIN EMBODIMENTS OF THE DISCLOSURE

In various example embodiments, a technique for pipeline sensor integration of a pipeline network (such as for oil and gas or for petrochemical industries) is provided. In some such embodiments, the unification of various sensor data of a pipeline network provides information on the locations of hydrocarbon products and predicts their corresponding flows in the network. In some such embodiments, sensor data from various sensors of the pipeline network are combined to achieve enhanced and reliable analysis of product flow (such as hydrocarbon product flow) in the pipeline network. In one such embodiment, a machine learning approach unifies all sensor data from a pipeline network in order to enhance the separate sensor responses and provide a predictive analysis of product locations within the pipeline network. In another such embodiment, the incorporation of artificial intelligence with commonly used sensors provides for the unification of signals from different sensors. This enhances the response (such as improves the signal to noise ratio from the sensor responses) and provides a predictive capability. Such capabilities provide for advanced sensing and prediction of hydrocarbon products' locations in pipeline networks.

As discussed earlier, in petrochemical industries such as the oil and gas industry, shared pipeline networks transport different hydrocarbons (e.g., liquid hydrocarbons, such as gasoline) at different locations and different times in the network. As such, there are many elements and aspects of a pipeline network and its operation that affect the corresponding flows of the different hydrocarbons through the pipeline network. In addition, integrity issues in the pipeline network (e.g., leaks, defective valves) can affect the flow rates and product mixing of the hydrocarbons. Further, the gradual fabrication of the pipeline network over time and over a relatively large geographical area leads to a disparate assortment of sensors put in place to measure different parameters such as speed, pressure, density, and temperature, to name a few. These sensors have their own peculiarities, reliabilities, manufactures, and characteristics (such as sensitivities, inputs, and outputs). As such, even similar parameters being measured by such different sensors leads to numerous sensor integration problems.

Accordingly, in example embodiments, a technique of pipeline sensor integration for product mapping, such as to know the present locations and the predicted locations of hydrocarbon products in the pipeline network, is provided. In some such embodiments, the technique is for a petrochemical pipeline network including numerous disparate and dispersed sensors. The technique provides for a platform (such as a server computer, a workstation, a laptop computer, or other computing device) configured to unify the responses from all the sensors. For example, the platform can be programmed by code or other logic, trained by artificial intelligence techniques, or otherwise configured to carry out the tasks assigned to it. As such, the location of each product (such as hydrocarbon product) in the pipeline network can be tracked and known at all times.

In some such embodiments, by using techniques of artificial intelligence, specifically machine learning techniques, the responses of each detector or sensor can be greatly enhanced by looking at feature commonalities from different sensor responses. From output patterns and behaviors of signal responses, the arrival times of the pipeline products in transit can be accurately predicted. In addition, integrity issues in the pipeline network can be monitored and located, and product storage at the corresponding destinations can be effectively and efficiently managed (particularly in multi-product pipelines).

In some embodiments, a platform that is trained using artificial intelligence techniques (such as machine learning techniques) is provided. The platform is capable (e.g., configured as described herein) of utilizing current or already deployed sensors in a pipeline network to maximize the sensors' capabilities and use. By way of example, in one embodiment, the platform is configured by code and machine learning techniques to determine product locations through the various sensor responses and combinations of sensor responses from the different sensors. In addition, the platform is further configured by code and machine learning techniques (e.g., historical data with machine learning) to determine abnormal activities within the pipeline transportation network and notify operators of these abnormalities. The platform is also configured by code and machine learning to determine and locate defective assets within the pipeline network. For example, a pressure drop can indicate a leak, a change in flow velocity of a product can indicate a leak, to name a few. A combined response from different sensors or different sensor types (or both) allows the defect to be determined.

In some such embodiments, the platform is configured by code, logic, machine learning, or a combination of these, to predict the flow rates and arrival times of the different products. For example, in one such embodiment, these predictions are based on responses from all the detectors or sensors in the pipeline network and coupled with historical data on flow rates and arrival times using machine learning. In addition, in some such embodiments, the sensor capabilities are enhanced by using machine learning and combined signal responses from different sensors. While some sensors show only slight variations to different stimuli, when combined with the responses of other detectors or sensors in the pipeline network, these variations can be amplified using machine learning techniques described herein. This amplification provides, for example, more useful information that can be acted upon.

In some embodiments, the platform is configured by code and machine learning to provide enhanced product identification in multiproduct pipelines. For example, present sensor systems in pipeline networks are usually not effective at or capable of distinguishing between gasoline 91 (e.g., 91 octane gasoline) and gasoline 95 (e.g., 95 octane gasoline). However, in some embodiments, the platform is configured by code and machine learning to combine the responses of different detectors (e.g., density, pressure, and temperature sensors, to name a few) in the pipeline network. This combining produces more accurate identifications of the products in the pipeline network. In addition, in some such embodiments, the platform is further configured by code and machine learning to identify dark areas (e.g., portions of the pipeline network without adequate sensor coverage). These are locations where sensors should or could be installed to monitor the pipeline network more effectively. In one such embodiment, the platform is further configured by code and machine learning to identify and locate defective sensors in the pipeline network (e.g., based on historical data coupled with machine learning).

In some embodiments, the platform is configured by code and machine learning to effectively predict the arrival times of products to bulk plants (e.g., storage facilities) to avoid issues of contamination and the like during storage. In some such embodiments, the platform is further configured by code and machine learning to notify operators to take action in case of a product change in a pipeline. For example, one such action is switching valves at the receiving end in a bulk plant to redirect different products to different storage tanks. In some such embodiments, the platform is further configured by code and machine learning to couple with the Industrial Internet of Things (IIoT) to carry out corrective or appropriate actions automatically. For instance, when the platform detects a change in products at the receiving end (e.g., for a multiproduct pipeline), the platform is further configured by code to control the valves connecting the pipeline network to the product storage facilities (e.g., bulk plant). Such control includes redirecting the different products to their appropriate corresponding storage tanks.

In some embodiments, the platform is configured by code and machine learning to detect contaminated products by comparing the sensing results from different sensors with those of historical results. As a result of these comparisons, the platform is further configured to identify possible causes, such as the most likely causes, including contamination from some source such as excess water, drag reducing agents, sediment, or the like.

The described techniques herein can be implemented using a combination of sensors, transmitters, valves, and other devices including computing or other logic circuits configured (e.g., programmed) to carry out their assigned tasks. These devices are located on or in (or otherwise in close proximity to) a pipeline network (e.g., one or more pipelines connected together with valves, together with sensors to monitor the network, shipping facilities to generate or supply the hydrocarbons, and receiving facilities to store or further process the hydrocarbons). In some example embodiments, the control logic is implemented as computer code configured to be executed on a computing circuit (such as a microprocessor) to perform the control steps that are part of the technique. For ease of description, this processing logic (e.g., ASIC, FPGA, processor, custom circuit, or the like) will be referred to as a control circuit or a prediction circuit throughout. For further ease of description, this control circuit or prediction circuit is programmable by code to perform the control logic or prediction logic (or otherwise customize the circuit to perform its intended purpose).

Figure 1:
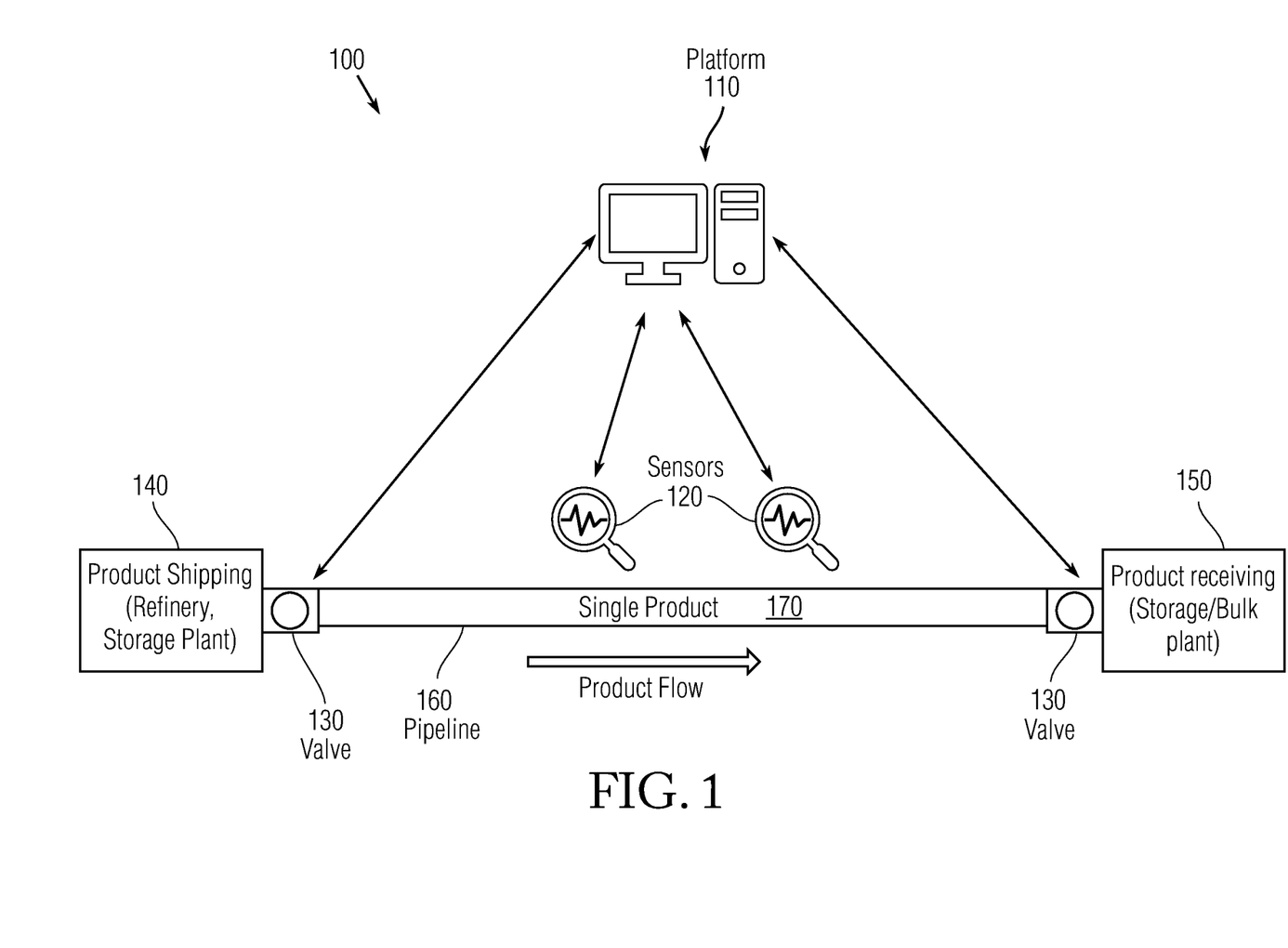
FIG. 1 is a schematic diagram of a single product pipeline network for product mapping or managing by an example pipeline sensor integration platform, according to an embodiment.

FIG. 1 is a schematic diagram of a single product pipeline network 100 for product mapping or managing by an example pipeline sensor integration platform 110, according to an embodiment. FIG. 1 is an example of a single product pipeline network 100. This refers to a hydrocarbon transportation network 100 that contains a single product 170 (e.g., gasoline, kerosene, diesel) in a pipeline 160. In general, this is a more straightforward pipeline where the product 170 is expected to be known at all times. The platform 110 is a computation device, such as a computer, server, or desktop system. In addition, the platform 110 can include various interfaces (e.g., input and output devices, non-volatile storage devices, communication interfaces) for interacting with the rest of the pipeline network 100.

The pipeline network 100 further includes a product shipping facility 140 (e.g., a refinery or storage plant) at one end (e.g., a sending end) of the pipeline 160. In addition, the pipeline network 100 includes a product receiving facility 150 (e.g., a storage tank or bulk plant) on another end (e.g., a receiving end) of the pipeline 160. The single product 170 flows from the shipping end 140 to the receiving end 150 along the pipeline 160 in the product flow direction. Access to the pipeline 160 between the shipping facility 140 and the receiving facility 150 is controlled by valves 130 at each end of the pipeline 160. Sensors 120 monitor different conditions (e.g., temperature, pressure, density, flow rate, to name a few) of the pipeline 160 and the product 170 during the transportation. The sensors 120 can communicate with the platform 110 by, for example, wired communication links, wireless communication links, or a combination of wired and wireless communication links. In some embodiments, the sensors 120 and the valves 130 are connected to (and can be controlled through) a communications network, such as the IIoT.

The platform 110 is programmed or otherwise configured to receive sensor readings from the sensors 120, integrate the results, and control the valves 130 appropriately. This valve control is based on factors such as the identification of and the computed arrival time of the product 170 at the receiving end 150. By way of example, the platform 110 can be programmed or otherwise configured to use the IIoT to interact with the sensors 120 and control the valves 130.

According to some embodiments, the platform 110 is programmed or otherwise configured to determine the location of the product 170 and arrival time of the product 170 between the sending end 140 and receiving end 150. In addition, the platform 110 is further programmed or configured to determine any anomalous behavior (e.g., product contamination, issues with the pipeline 160, and the like). In some such embodiments, the platform 110 is further programmed or otherwise configured to use the IIoT and results from being trained by machine learning techniques to determine the positions of the valves 130 at the receiving end 150 (e.g., bulk plant storage facility). Such a capability allows the manual process of controlling the valves 130 to be removed.

Figure 2:
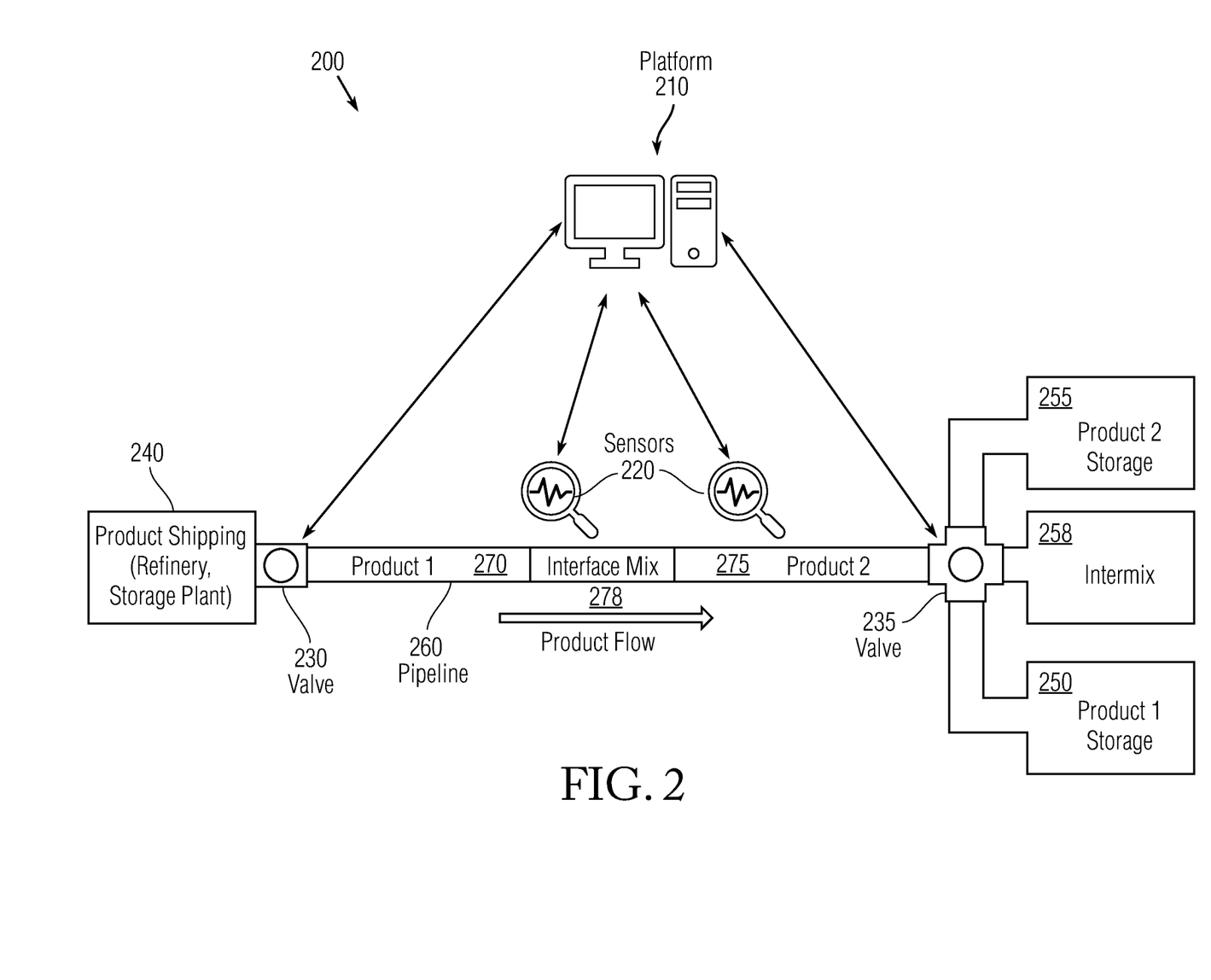
FIG. 2 is a schematic diagram of a multiproduct pipeline network for product mapping or managing by an example pipeline sensor integration platform, according to an embodiment.

FIG. 2 is a schematic diagram of a multiproduct pipeline network 200 for product mapping or managing by an example pipeline sensor integration platform 210, according to an embodiment. FIG. 2 is an example of a multiproduct pipeline network 200. This refers to a hydrocarbon transportation network 200 that contains multiple products 270 and 275 (e.g., gasoline 91 and gasoline 95, or kerosene and diesel) in a pipeline 260. The pipeline network 200 further includes an interface mixture 278 at boundary regions of (and including mixtures of) the multiple products 270 and 275. This is a more challenging situation than the single product pipeline network 100 of FIG. 1, as the mixing of multiple products creates a lot more combinations to keep track of and manage with even greater precision than a single product. The platform 210 can be similar to the platform 110 of FIG. 1.

The pipeline network 200 further includes a product shipping facility 240 (e.g., a refinery or storage plant) at one end (e.g., a sending end) of the pipeline 260, and multiple receiving facilities 250 and 255 on another end (e.g., a receiving end) of the pipeline 260. The receiving facilities include a storage tank 250 for storage of a first product 270, and a storage tank 255 for storage of a second product 275. The receiving end further includes a storage tank 258 for storage of an interface mixture 278 of the first product 270 and the second product 275 (e.g., for later separating into the first product 270 and the second product 275). The first product 270, second product 275, and interface mixture 278 flow from the shipping end 240 to the receiving end along the pipeline 260 in the product flow direction. In addition, proper application of a valve 235 on the receiving end directs the three different products (first product 270, second product 275, and interface mixture 278) to the corresponding storage tanks 250, 255, and 258, respectively.

Access to the pipeline 260 between the shipping facility 240 and the receiving storage tanks 250, 255, and 258 is controlled by a valve 230 at the shipping end and the valve 235 at the receiving end of the pipeline 260. Sensors 220 monitor different conditions (e.g., temperature, pressure, density, flow rate, to name a few) of the pipeline 260 and the products 270, 275, and 278 during the transportation. The sensors 220 can communicate with the platform 210 by, for example, wired communication links, wireless communication links, or a combination of wired and wireless communication links. In some embodiments, the sensors 220 and the valves 230 and 235 are connected to (and can be controlled through) a communications network, such as the IIoT.

The platform 210 is programmed or otherwise configured to receive sensor readings from the sensors 220, integrate the results, and control the valves 230 and 235 appropriately. This valve control is based on factors such as the identifications of and the computed arrival times of the different products 270, 275, and 278 at the receiving end. By way of example, in some embodiments, the platform 210 is programmed or otherwise configured to use the IIoT to interact with the sensors 220 and to control the valves 230 and 235. This valve control is to direct the first product 270 to the first storage tank 250, the second product 275 to the second storage tank 255, and the interface mixture 278 to the intermix storage tank 258.

In further detail, in some embodiments, the pipeline network 200 is a hydrocarbon transportation network 200 that contains two or more hydrocarbon products 270, 275, and 278 in a single pipeline 260. This is a more complex network than the pipeline network 100 of FIG. 1, and knowledge of the product locations and volumes is critical to avoid contamination at the receiving end. For instance, the receiving end can be a bulk plant where the products 270, 275, and 278 are stored before distribution or further processing. Here at the sending side (such as a refinery), the products are sent in batches, such as 8 hours of diesel followed by 8 hours of kerosene. It should be noted that the products are batched back to back. As the products travel along the pipeline a certain volume of the products will mix, which is known as the interface or intermix volume.

Several factors can influence the mixing of the products, such as flow rates, pressures, temperatures, to name a few. Knowledge of the intermix volume is critical at the receiving end to ensure that any off-spec product (e.g., interface mixture 278) is not stored in the bulk plants in the same tanks as the pure products. Issues related to contamination can occur, such as timing errors or product identification errors at the receiving end. This can result, for example, in diesel being stored in the kerosene storage tank (and vice versa). According to some embodiments, the platform 210 uses the IIoT together with results from machine learning techniques to determine the proper position of the valves 235 at the receiving end. For example, this automated valve control can take place at a bulk plant storage facility to properly direct the flowing products into their appropriate storage tanks. This can allow the manual process of changing the valve 235 to be removed, which helps reduce the negative impact of human error.

Figure 3:
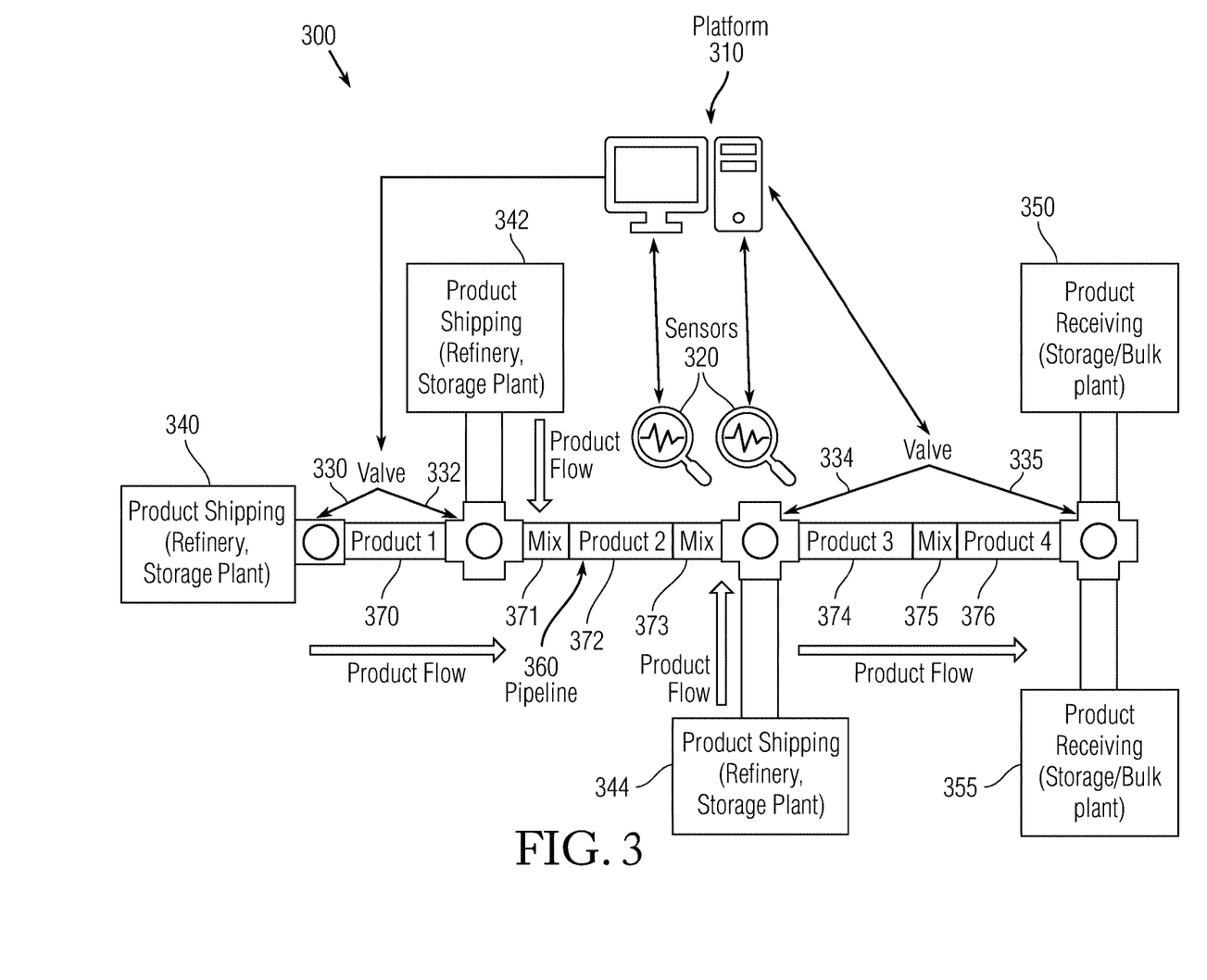
FIG. 3 is a schematic diagram of a multiproduct multi-pipeline network for product mapping or managing by an example pipeline sensor integration platform, according to an embodiment.

FIG. 3 is a schematic diagram of a multiproduct multi-pipeline network 300 for product mapping or managing by an example pipeline sensor integration platform 310, according to an embodiment. FIG. 3 is an example of a multiproduct multi-pipeline network 300. This refers to a hydrocarbon transportation network 300 that contains multiple products 370, 372, 374, and 376 (e.g., gasoline 91, gasoline 95, kerosene, and diesel) in a pipeline 360. In addition, the pipeline network 300 includes interface mixtures 371, 373, and 375 at boundary regions of (and including mixtures of) the multiple products 370, 372, 374, and 376. More specifically, a first interface mixture 371 represents a mixture of a first product 370 and a second product 372. In addition, a second interface mixture 373 represents a mixture of the second product 372 and a third product 374. Further, a third interface mixture 375 represents a mixture of the third product 374 and a fourth product 376.

This is a more challenging situation than the multiproduct pipeline network 200 of FIG. 2. For instance, the multiple mixing of different combinations of multiple products creates a lot more combinations to keep track of and manage with even greater precision than two products (and their interface mix). The platform 310 can be similar to the platforms 110 and 210 of FIGS. 1 and 2. However, unlike the pipeline networks 100 and 200 of FIGS. 1 and 2, the pipeline network 300 further includes multiple product shipping facilities upstream of the pipeline 360. These product shipping facilities can be, for example, refineries or storage plants. These product shipping facilities include a first product shipping facility 340, a second product shipping facility 342, and a third product shipping facility 344. The output of each of these product shipping facilities is controlled by a corresponding valve. These valves include a first valve 330 to control the output of the first product shipping facility 340, a second valve 332 to control the output of the second product shipping facility 342, and a third valve 334 to control the output of the third product shipping facility 344.

In addition, treating the output of the first product shipping facility 340 between the first valve 330 and the second valve 332 as part of the (main) pipeline 360, there are still two further pipelines in the multi-pipeline network 300 (versus the single pipeline networks 100 and 200). These additional pipelines include a pipeline connecting the second product shipping facility 342 to the pipeline 360 (via the second valve 332) and a pipeline connecting the third product shipping facility 344 to the pipeline 360 (via the third valve 334). As such, the management of the multi-pipeline network 300 is further complicated by controlling the first valve 330, the second valve 332, and the third valve 334. These valves control the selection of which pipeline (and by extension, product shipping facility) outputs into the pipeline 360.

The pipeline network 300 further includes multiple product receiving facilities 350 and 355 (e.g., storage tanks or bulk plants) at a downstream end (e.g., a receiving end) of the pipeline 360. The product receiving facilities 350 and 355 receive the different products and their mixtures as they flow along pipeline 360 in the product flow direction (e.g., from upstream to downstream). Further, the product receiving facilities 350 and 355 direct the different products and mixtures to appropriate processing or storage areas under the control of a valve 335. In addition, proper application of valves 330, 332, and 334 control the inlet of products from the product shipping facilities 340, 342, and 344, respectively.

Sensors 320 monitor different conditions (e.g., temperature, pressure, density, flow rate, to name a few) of the pipeline 360. The sensors 320 also monitor the first, second, third, and fourth products 370, 372, 374, and 376, respectively, and the first, second, and third interface mixtures 371, 373, and 375, respectively, during the transportation. The sensors 320 can communicate with the platform 310 by, for example, wired communication links, wireless communication links, or a combination of wired and wireless communication links. In some embodiments, the sensors 320 and the valves 330, 332, 334, and 335 are connected to (and can be controlled through) a communications network, such as the IIoT.

The platform 310 is programmed or otherwise configured to receive sensor readings from the sensors 320, integrate the results, and control the valves 330, 332, 334, and 335 appropriately. This valve control is based on factors such as the identifications of and the computed arrival times of the different products 370 through 376 at the receiving end. By way of example, the platform 310 can be programmed or otherwise configured to use the IIoT to interact with the sensors 320 and control the valves 330, 332, 334, and 335. These valve controls direct the first product 370, second product 372, third product 374, and fourth product 376 to appropriate storage tanks in the product receiving facilities 350 and 355. The valve controls also direct the first interface mixture 371, second interface mixture 373, and third interface mixture 375 to appropriate storage tanks or processing areas of the product receiving facilities 350 and 355.

In further detail, in the multiproduct multi-pipeline (MP-MP) network 300 of FIG. 3, knowledge of the different hydrocarbon products (e.g., types, locations, mixtures) at all times is critical to avoid unintended contamination. The complexity of the network 300 and the many issues that can occur (e.g., manual changing at junctions, anomalies along the pipeline 360 such as leaks or damage) generally limit the use of such networks. However, in example embodiments, with an adequate monitoring (e.g., sensors 320) and automated process (e.g., platform 310) in place, product transportation can be improved or optimized using these networks.

By way of example, in some such embodiments, the platform 310 is programmed or otherwise configured to use the IIoT to interact with the sensors 320 and control the first, second, third, and fourth valves 330, 332, 334, and 335, respectively. This valve control directs the first product 370, the second product 372, the third product 374, and the fourth product 376 to appropriate storage tanks in the product receiving facilities 350 and 355. This valve control also directs the first interface mixture 371, the second interface mixture 373, and the third interface mixture 375 to appropriate storage tanks or further processing areas of the product receiving facilities 350 and 355. In one such embodiment, the platform is programmed or otherwise configured (e.g., through machine learning techniques) to use the IIoT in order to determine the positions of the valves 330, 332, 334, and 335 at each junction and the receiving end (e.g., bulk plant storage facilities). This automation can remove the manual process of changing the valves 330, 332, 334, and 335, and help eliminate human error.

By contrast, other multiproduct pipelines may be managed using a manual process under control of an operator. Here, the time of travel of the product between shipping and receiving is known (assuming no problems occur along the pipeline) and the intermix volume is known from historical behavior of the pipeline (again, assuming no issues along the way). The operator manually directs the pipeline output to the correct storage tank (e.g., diesel tank, kerosene tank, intermix tanks). In such a network, sensors are usually installed along each portion of the pipeline network. Each sensor is in place to monitor different parameters and properties of the hydrocarbon products in the pipeline transportation network as well as external environmental conditions for activities related to and unrelated to the pipeline transportation network.

Unfortunately, there are several factors that affect the potential of these sensing devices. These factors include, but are but not limited to: sensor responses fading over time, the harsh environment where the sensors are located, the disparate assortment and maintenance of the various sensors, non-pipeline sensors being installed close to (but not necessarily on) the pipeline, and the limited responses from the sensors. In further detail, sensor responses fade over time. This is particularly true for sensors that are in contact with the products (e.g., invasive probe sensors), which degrade over time as a result of, for example, sediment and unwanted material (dirt) buildup on the senor sensitive area. While optical interface detector (OID) devices have been installed in several pipelines, they are generally not relied upon because of the low signal to noise ratio resulting from a compromised sensitive area on the sensor. In addition, many installed sensors are not used to their full potential as a result of these and similar reasons.

Further, the harsh environment where sensors are located leads to their degradation in the signal to noise ratio over time. In general, sensors on the pipeline network are deployed and installed by different departments throughout a company. As such, the responses from the sensors are not consistent or unified, and there is no common database collecting all the information. In addition, sensors installed close to the pipeline, but not necessarily on the pipeline, are used for sensing other (non-pipeline-related) parameters, such as weather conditions. These sensors could be used to provide additional information useful to determine product identification within the pipeline. Furthermore, sensors can provide limited accuracy in their responses. This is particularly true for similar products in multi-product pipelines. For example, sensors to measure the density of different hydrocarbon products can be far enough off during individual measurements as to not be able to discern the density difference between gasoline 91 and gasoline 95 (which are very similar). As a result, the corresponding individual responses from such sensors cannot be relied upon by operators to make informed decisions.

Accordingly, in various embodiments, the accuracy and consistency of responses (e.g., readings) of sensors and sensor devices already installed across (or in close proximity to) a pipeline network are increased or maximized. This is accomplished by configuring machine-learning-based platforms (e.g., through code and machine learning techniques) to examine common changes or features in signals (even with low signal to noise ratios). This allows the hydrocarbon products under observation in the pipeline network to be identified and their corresponding positions or locations mapped in the pipeline transportation network. In some such embodiments, the platform is further configured by code and machine learning techniques to unify the responses from different sensors. This is done, for example, in order to measure (or better measure) the same parameter. The machine learning techniques can include, for example, using historical data to train the platform using machine learning.

For instance, in some such embodiments, the platform is further configured to unify the sensor readings of sensors from different manufacturers and that are installed by different departments for different reasons (e.g., flow rates, densities, pressures, and the like). This is done, for example, in order to measure the same parameter of interest, only more accurately and consistently than possible with only using sensor readings from single devices.

For example, in some embodiments, using machine learning techniques together with knowledge of historical behavior from the different sensors, the platform can be configured to isolate specific features from the different sensor responses. This can increase or maximize the output accuracy and consistency for those features.

Such an approach can also provide for various benefits, including enhanced signal to noise ratio by examining specific features related to the corresponding hydrocarbon products. The benefits further include behavioral analysis of sensor devices over time, which can allow for enhanced maintenance, repair, and replacement schedules of the sensor devices. The benefits also include identifying areas where sensors should be implemented (e.g., added or upgraded) in the pipeline network to gain a more comprehensive insight of the pipeline network and the different hydrocarbon products within it. In addition, the benefits include identifying which sensors are the most adequate for the mapping of products. The benefits further include predicting the flow of hydrocarbons through examining historical behavior. The benefits also include predicting the presence and arrival time of hydrocarbon flows when abnormal behavior of the pipeline occurs, such as a drop in pressure due to a leak. In addition, the benefits include allowing for an automated system to control receiving (e.g., automated valve controls) hydrocarbon products being transported in the pipeline network.

In further detail, there are many benefits of incorporating artificial intelligence (AI) techniques into the configuring of platforms (e.g., servers and other computer systems) to integrate various sensors (and their responses). Such integration can be, for example, to map and manage the locations of hydrocarbon products throughout a pipeline network. For instance, under such an approach, the responses of the sensors in the pipeline network already in place can be made "intelligent" or "smart" through the use of AI, in particular (but not limited to) machine learning (ML) and deep learning (DL, a subset of ML).

For example, AI can be used to configure platforms to provide predictions on the locations of the hydrocarbon products in the pipeline by associating different sensor readings to specific products. This can take place when, for example, kerosene and diesel are shipped in the same pipeline (such as pipeline 260 in FIG. 2). In some embodiments, this trained ML model is used to configure platforms to distinctly identify the subsection of the pipeline containing kerosene, the subsection containing diesel, and the subsection containing the mixture of both. Once these boundaries are identified, the platform is further configured to map these locations to a user interface (such as a display device or interface) that allows the operator to visualize the pipeline network. It also allows the operator to take any necessary or appropriate actions accordingly, such as diverting the shipped products to their respective tanks based on their locations. As noted below, in certain implementations, the AI component can comprise the operator and actions can be taken by a daemon which is a module, code or configuration which is configured and arranged to control physical devices in order to take actions that would otherwise be taken by a human operator, and to do so with the benefit of integrated sensor data.

In some such embodiments, the platforms are further configured to use the trained ML model to make decisions on actual arrival times. These decisions can include automating the valve controls at bulk plants to appropriately divert the hydrocarbon products in the pipeline network to their corresponding storage tanks for processing areas. This provides a platform for smart facilities instead of relying on a human operator (and human fallibility) to make the appropriate choices.

In some such embodiments, the platforms are configured using AI as a powerful tool. For example, the platforms are configured using AI-developed models that learn (e.g., using ML techniques) from previous and historical data (e.g., signals, arrival times, and the like) to make intelligent observations and predictions based on this data. This information is fit to different ML models using various ML techniques, algorithms, and approaches. There are several known techniques, including (but not limited to): convolutional neural networks (CNNs), recurrent neural networks (RNNs), ensemble learning methods such as adaptive boosting (e.g., Adaboost) learning, decision trees, support vector machines (SVMs), and other supervised learning techniques.

As an example, a ML technique for incorporating into a platform for pipeline sensor integration, in order to do product mapping and managing, includes performing the following steps. It should be noted that numerous, if not all of the steps, can be automated or mostly automated. For instance, the platform can be configured by code to carry out most or all of these steps. The technique begins with the step of data collection. In some sense, this is the most important step of all, as it will determine the overall accuracy of the ML model. Sufficient data must be provided to ensure that there are few or no problems with sampling and bias. In this application, each sensor on or close to the pipeline network provides data (e.g., sensor readings or responses). In addition, further useful information can be provided, such as log books for shipping times and arrival times of products, information on incidents that already occurred in the past and their effect on the hydrocarbon products, and the like.

The technique continues with the step of data exploration and profiling. Once the data is collected, its condition must be assessed (e.g., look for trends, outliers, exceptions, incorrect information, inconsistent or missing information, and the like). Possible inquiries include, for instance, does a pressure sensor have its units correctly identified, or are the scales correct, or other such inquiries. It should be noted that geographic location is an important point when considering units or commonly used units.

The technique continues with the step of formatting the data to ensure consistency. In this step, the sensor data is preprocessed to ensure consistency. In one example embodiment, this includes a format step, a cleaning step, a sampling step, and statistics step. Here, formatting the data includes ensuring the data is in a usable format. For example, some sensors provide proprietary data structures, so these need to be converted to more open data structures to allow other tools access to the data. Cleaning the data includes handling incomplete sequences of data. This is because some sequences of data may be incomplete and do not carry the data required to make predictions. This cleaning can include removing data (if it is not possible or practical to restore the sequence) or fixing the sequence by adding the missing data from the sequence (e.g., when a sequence is mostly complete and it is more practical or useful to restore the sequence).

Sampling can be beneficial in those cases where the amount of data received is far more than required (e.g., significant amounts of duplicative or redundant data). This not only reduces the size of the data, it can significantly increase the speed of the technique. Statistical analysis can include, for example, finding means and standard deviations of the input data: This is a useful way to look at the consistency of the data.

The technique further includes the step of improving data quality. Here, erroneous data is removed, such as removing data with invalid formats, or removing data with errors in it, such as missing numbers or scales, missing parts, or incorrect information. Such erroneous data can also include data where no information or changes are present, such as from a defective sensor whose data gives a consistent value, but not the correct value.

At this point, the technique includes the step of feature engineering. This step improves the performance of the ML learning models. It includes converting the raw data into features that can be used by the ML techniques as a way to learn so that it can later detect similar behaviors in the future. To perform this task, a multitude of methods can be used, the most common of which include imputation, handling outliers, binning, logarithm (log) transform, and one-hot encoding: Imputation refers to inserting a numeric value when one is missing. For instance, if a column of data contains 1's as well as a single NA, then, based on the data, NA could be replaced with a 0. Handling outliers can be done by plotting the data and removing any obvious erroneous data outliers. This can also be handled using the standard deviation, such as removing data whose value is too far from the standard deviation of the remaining data.

Binning includes aggregating data into bins (similar attributes), replacing multiple values (in the same bin) with single values representative of the multiple values (e.g., averages, medians, or modes of the multiple values). Binning can drop data and potentially lose information, but normally improves the performance of the ML techniques with relatively few adverse effects. Log transform includes transforming data values into their logarithms, which can help handle skewed data (e.g., prevent it from having as significant an effect on the other data as it would otherwise have). One-hot encoding replaces binary values with corresponding bit strings exactly one of whose bits is one (and the rest are zero). This allows, for example, data in a single column to be spread over several columns.

The technique further includes the step of splitting the data into training and evaluation sets. That is, the data is split into two different sets. One set of data is used to train the ML techniques, while the other set is used to evaluate the ML techniques. Note that it is customary that the two sets should not contain any overlapping data. The technique next includes the step of model training and evaluation. Here, once the data has been processed and split, it is used to train and evaluate an ML model. In one example embodiment, the ML model is trained (on the training set of data) to be able to take the sensor data as input, and output the hydrocarbon product at that sensor location. After training the model, the ML model is evaluated (on the evaluation set of data) using metrics such as precision, recall, accuracy, Fi score, and the like, to ensure that the ML model is reliable and can generalize well on unseen examples.

Then the technique includes the step of production and post processing, where the trained ML model is deployed, for example, as part of a software package on the platform, together with a user interface. For example, the user interface can be configured by code to allow the user to visualize all types of hydrocarbon products and their locations in the pipeline network, and take the necessary action(s) to maintain pipeline network integrity. In an example embodiment, the software is configured (e.g., by code and the trained ML model) to take as input the raw sensor data and output the different product locations. Additionally, all sensor locations as well as the product shipping information (e.g., flow rates, pipe diameters, pressures, etc.) are known, such as through databases or recent measurements. As such, the platform is further configured (for example, by code) to include a post-processing step that calculates the arrival times of each product that is shown to the users based on this known information.

Figure 4:
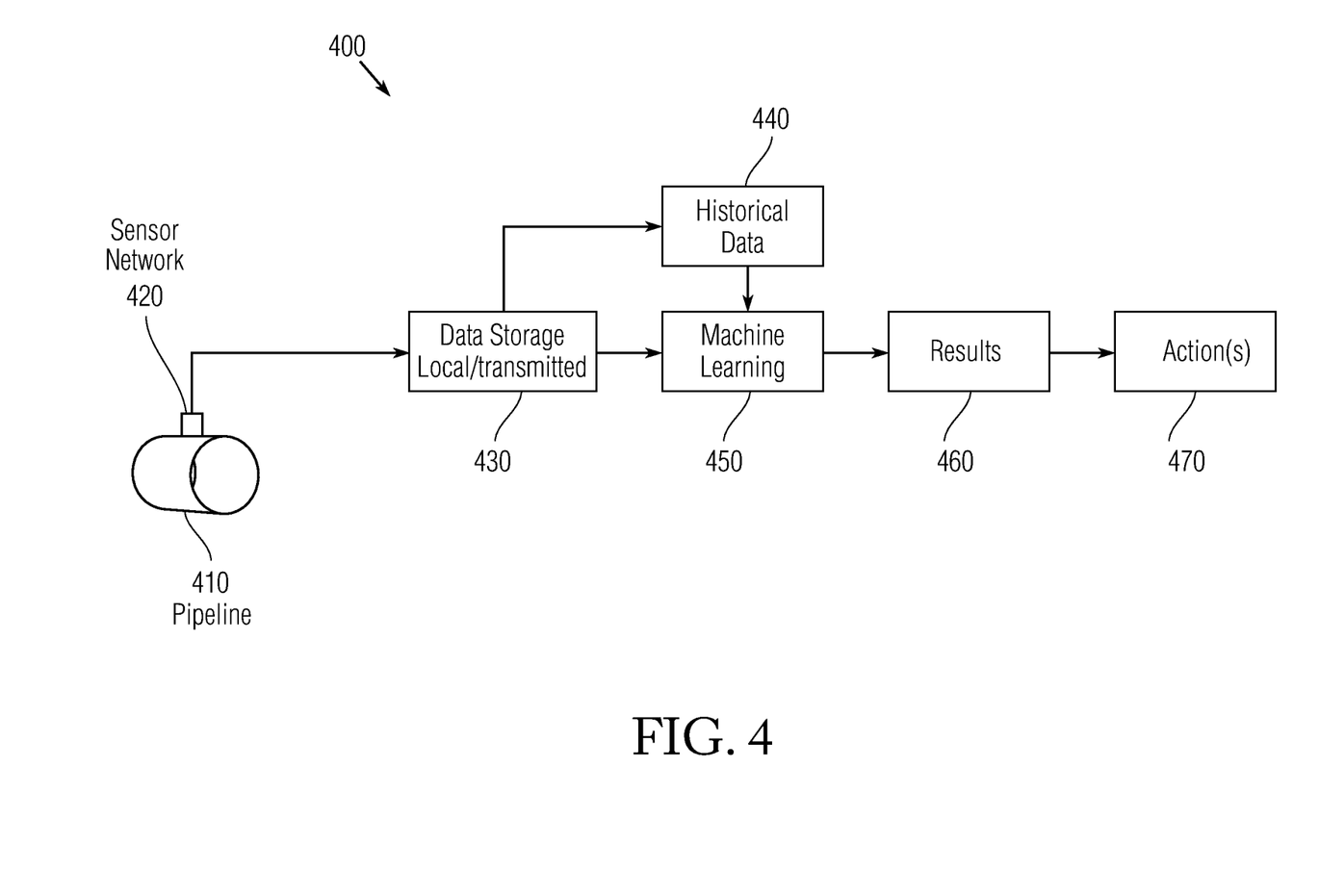
FIG. 4 is a block diagram of an example process for generating and using a machine learning (ML) model for pipeline sensor integration of a pipeline network, according to an embodiment.

FIG. 4 is a block diagram of an example process 400 for using a machine learning (ML) model 450 for pipeline sensor integration of a pipeline network, according to an embodiment. The pipeline network includes a pipeline 410 and a sensor network 420. In addition, the ML model 450 is built using an ML technique, such as one of the ML techniques discussed earlier. By way of example, in one embodiment, a platform is configured by code and the ML model 450 to perform the process 400.

The process 400 includes the step of collecting 430 new data from the sensor network 420 (e.g., from each sensor in the data network 420) in proximity to the pipeline 410. The new sensor data is stored locally (such as in flash memory or random access memory) and transmitted for storage (for example, on a non-transitory storage device) or further processing. For example, the sensor data is sometimes stored in a database 440 of historical data, such as to be used for training of a future ML model (e.g., to enhance the accuracy of the ML model 450). As part of the collecting 430, the data to be passed to the ML model 450 is pre-processed to ensure consistency and quality. The pre-processed sensor data is then ingested by the ML model 450 to produce results 460 (e.g., hydrocarbon product identifications and mappings in the pipeline 410). Based on the results 460, the process 400 can further include configuring the platform (e.g., by code) to perform automated actions 470. These actions 470 can include, for example, controlling of valves at various junctures in the pipeline 410 to direct the flow of the products to the appropriate storage facilities or processing areas.

Figure 5:
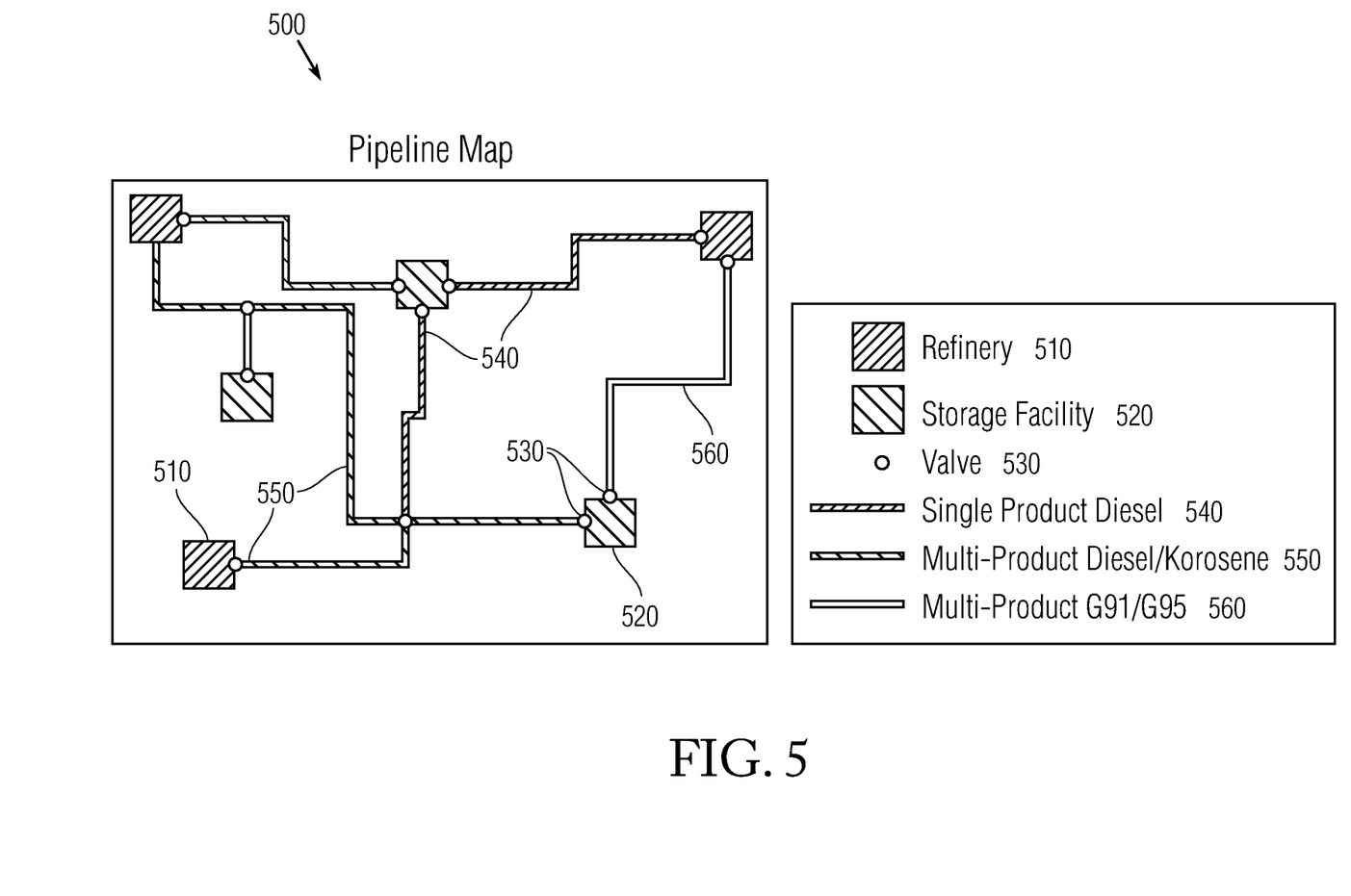
FIG. 5 is a schematic diagram of an example pipeline map of a pipeline network, output by an example pipeline sensor integration platform using an ML model, according to an embodiment.

FIG. 5 is a schematic diagram of an example pipeline map 500 of a pipeline network, output by an example pipeline sensor integration platform using an ML model, according to an embodiment. The representation of output from such a platform can take on many forms, an example of which is presented in FIG. 5.

The pipeline map 500 of FIG. 5 includes sending facilities (e.g., refineries 510), receiving facilities (e.g., storage facilities 520 or bulk plants), and valves 530 for controlling outputs and inputs at the different facilities. The pipeline map 500 further includes the different pipelines that make up the pipeline network that interconnects the sending and receiving facilities 510 and 520. Each pipeline is identified by the type of hydrocarbon products that use or share the pipeline, and is categorized as a single product or multi-product pipeline. For instance, pipeline 540 represents those pipeline segments that carry diesel exclusively (single product diesel segments). By contrast, pipeline 550 represents those pipeline segments that carry both diesel and kerosene (multiproduct diesel/kerosene segments). The pipeline 550 segments carry diesel some of the time, and kerosene at other times, with mixtures of the two happening when switching between a diesel portion and a kerosene portion.

Likewise, pipeline 560 represents those pipeline segments that carry both gasoline 91 (G91) and gasoline 95 (G95) (multiproduct G91/G95 segments). The pipeline 560 segments carry gasoline 91 some of the time, and gasoline 95 at other times, with mixtures of the two happening when switching between a gasoline 91 portion and a gasoline 95 portion.

Figure 6:
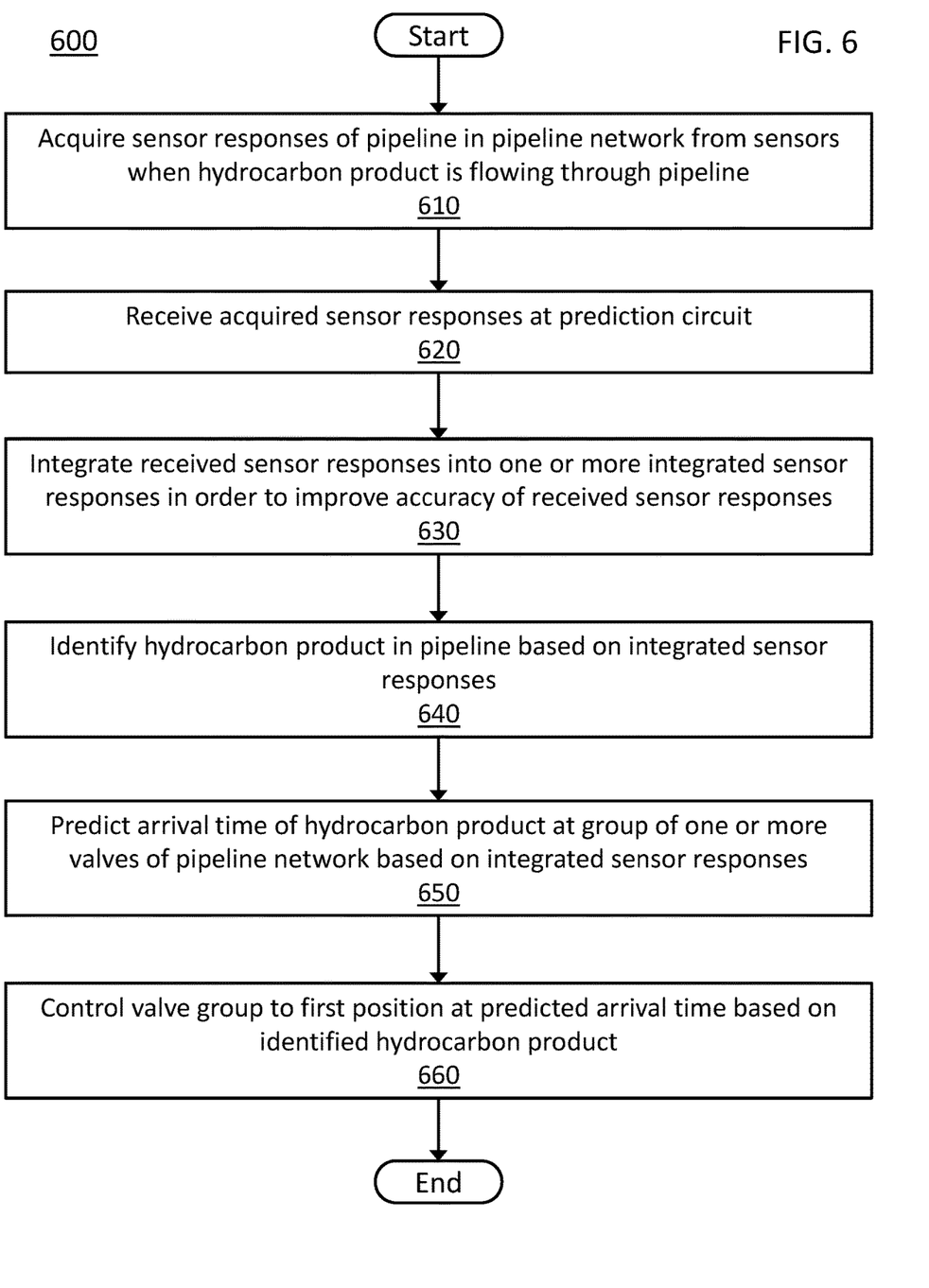
FIG. 6 is a flow diagram of an example method of pipeline sensor integration for product mapping or managing, according to an embodiment.

FIG. 6 is a flow diagram of an example automated method 600 of pipeline sensor integration for product mapping or managing a pipeline network (such as pipeline network 100, 200, or 300), according to an embodiment. The pipeline network includes a plurality of sensors (such as sensors 120, 220, or 320) for sensing a pipeline (such as pipeline 160, 260, or 360) of the pipeline network.

Some or all of the method 600 can be performed using components and techniques illustrated in FIGS. 1 through 5. Portions of this and other methods disclosed herein can be performed on or using a custom or preprogrammed logic device, circuit, or processor, such as a programmable logic circuit (PLC), computer, software, or other circuit (e.g., ASIC, FPGA) configured by code or logic to carry out their assigned task. The device, circuit, or processor can be, for example, a dedicated or shared hardware device (such as a laptop, a single board computer (SBC), a workstation, a tablet, a smartphone, part of a server, or a dedicated hardware circuit, as in an FPGA or ASIC, or the like), or computer server, or a portion of a server or computer system. The device, circuit, or processor can include a non-transitory computer readable medium (CRM, such as read-only memory (ROM), flash drive, or disk drive) storing instructions that, when executed on one or more processors, cause portions of the method 600 (or other disclosed method) to be carried out. It should be noted that in other embodiments, the order of the operations can be varied, and that some of the operations can be omitted. Some or all of the method 600 can also be performed using logic, circuits, or processors located on or in electrical communication with a platform configured to carry out the method 600.

In the example method 600, processing begins with the step of acquiring 610, by a plurality of sensors of the pipeline network, first sensor responses (e.g., pressures, densities, flow rates, temperatures, and the like) of a pipeline in the pipeline network when a first hydrocarbon product (such as diesel or kerosene) is flowing through the pipeline. The method 600 further includes the step of receiving 620, by a prediction circuit (such as platform 110, 210, or 310), the acquired first sensor responses. For example, in some embodiments, the sensors are connected to the Industrial Internet of Things (IIoT), and transmit their sensor responses to the prediction circuit using the IIoT. Here, the prediction circuit is built from training data using a machine learning process (such as CNNs or RNNs). The training data includes first training sensor responses of the pipeline by the plurality of sensors acquired at a previous time (e.g., during a training phase of machine learning) when the first hydrocarbon product was flowing through the pipeline. As such, the prediction circuit is trained to recognize sensor responses from these particular sensors and that indicative of this hydrocarbon product in the pipeline.

The method 600 further includes the step of integrating 630, by the prediction circuit, the received first sensor responses into one or more integrated first sensor responses (e.g., amplifying when multiple signals show correlation, attenuating when signals are not correlated with other signals) in order to improve accuracy of the received first sensor responses. The method 600 further includes the step of identifying 640, by the prediction circuit, the first hydrocarbon product in the pipeline based on the integrated first sensor responses. The method 600 further includes the step of predicting 650, by the prediction circuit, a first arrival time of the first hydrocarbon product at a group of one or more valves (such as valve 130, 235, or 335) of the pipeline network based on the integrated first sensor responses. The valve group directs hydrocarbon products in the pipeline network to their corresponding destinations (e.g., storage tanks, processing facilities, and the like). The method 600 further includes the step of controlling 660, by the prediction circuit, the valve group to a first position (e.g., to direct the first hydrocarbon product to its corresponding storage tank) at the predicted first arrival time based on the identified first hydrocarbon product.

In an embodiment, the method 600 further includes the step of detecting, by the prediction circuit, a leak in the pipeline based on the integrated first sensor responses (e.g., pressure drop, flow rate drop, or the like). The method 600 further includes the step of alerting, by the prediction circuit, an operator of the pipeline network about the detected leak. In an alternative embodiment, rather than controlling the valve group, the method 600 further includes the step of predicting, by the prediction circuit, an arrival time of the first hydrocarbon product at a location (such as an approach point to the valve group) in the pipeline network based on the integrated first sensor responses. In this alternative embodiment, the method 600 further includes the step of alerting, by the prediction circuit, an operator of the pipeline network about the predicted arrival time (e.g., so the operator can manually control the valve group to the appropriate position).

In certain implementations, the operator to which the alert is sent comprises a machine programmed to respond to such alerts with an automated action. For instance, the automated action can be to control the valve group and move it to a desired position in response to the alert or to a continued alert, or to divert product flow to respective tanks based on their locations.

The methods described herein may be performed in part or in full by software or firmware in machine readable form on a tangible (e.g., non-transitory) storage medium. For example, the software or firmware may be in the form of a computer program including computer program code adapted to perform some or all of the steps of any of the methods described herein when the program is run on a computer or suitable hardware device (e.g., FPGA), and where the computer program may be embodied on a computer readable medium. Examples of tangible storage media include computer storage devices having computer-readable media such as disks, thumb drives, flash memory, and the like, and do not include propagated signals. Propagated signals may be present in a tangible storage media, but propagated signals by themselves are not examples of tangible storage media. The software can be suitable for execution on a parallel processor or a serial processor such that the method steps may be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to a viewer. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. An automated method of pipeline sensor integration for liquid product mapping of a pipeline network, the method comprising:
    acquiring, by a plurality of sensors of the pipeline network, first training sensor responses of a pipeline in the pipeline network when a first liquid hydrocarbon product is flowing through the pipeline;
    building, by a machine learning circuit, a prediction circuit from the acquired first training sensor responses using a machine learning process;
    acquiring, by the plurality of sensors, first sensor responses of the pipeline when the first liquid hydrocarbon product is again flowing through the pipeline;
    receiving, by the built prediction circuit, the acquired first sensor responses;
    integrating, by the prediction circuit, the received first sensor responses into one or more integrated first sensor responses in order to improve accuracy of the received first sensor responses; and
    identifying, by the prediction circuit, the first liquid hydrocarbon product in the pipeline based on the integrated first sensor responses.

2. The method of claim 1, further comprising:
    detecting, by the prediction circuit, a leak in the pipeline based on the integrated first sensor responses; and
    alerting, by the prediction circuit, an operator of the pipeline network about the detected leak.

3. The method of claim 1, further comprising:
    predicting, by the prediction circuit, a first arrival time of the first liquid hydrocarbon product at a group of one or more valves of the pipeline network based on the integrated first sensor responses, the valve group being for directing liquid hydrocarbon products in the pipeline network to their corresponding destinations; and
    controlling, by the prediction circuit, the valve group to a first position at the predicted first arrival time based on the identified first liquid hydrocarbon product.

4. The method of claim 1, further comprising:
    predicting, by the prediction circuit, an arrival time of the first liquid hydrocarbon product at a location in the pipeline network based on the integrated first sensor responses; and
    alerting, by the prediction circuit, an operator of the pipeline network about the predicted arrival time.

5. The method of claim 1, further comprising:
    acquiring, by the plurality of sensors, second training sensor responses of the pipeline when a second liquid hydrocarbon product different than the first liquid hydrocarbon product is flowing through the pipeline, wherein the machine learning circuit builds the prediction circuit from the acquired first and second training sensor responses;
    acquiring, by the plurality of sensors, second sensor responses of the pipeline when the second liquid hydrocarbon product is again flowing through the pipeline, wherein the flowing of the second liquid hydrocarbon product through the pipeline and corresponding to the acquired second sensor responses follows the flowing of the first liquid hydrocarbon product through the pipeline and corresponding to the acquired first sensor responses;
    receiving, by the prediction circuit, the acquired second sensor responses;
    integrating, by the prediction circuit, the received second sensor responses into one or more integrated second sensor responses in order to improve accuracy of the received second sensor responses; and
    identifying, by the prediction circuit, the second liquid hydrocarbon product in the pipeline based on the integrated second sensor responses.

6. The method of claim 5, further comprising:
    predicting, by the prediction circuit, a first arrival time of the first liquid hydrocarbon product at a group of one or more valves of the pipeline network based on the integrated first sensor responses, the valve group being for directing liquid hydrocarbon products in the pipeline network to their corresponding destinations;
    controlling, by the prediction circuit, the valve group to a first position at the predicted first arrival time based on the identified first liquid hydrocarbon product;

predicting, by the prediction circuit, a second arrival time of the second liquid hydrocarbon product at the valve group based on the integrated second sensor responses; and controlling, by the prediction circuit, the valve group to a second position at the predicted second arrival time based on the identified second liquid hydrocarbon product, the second position being different than the first position.

7. The method of claim 6, wherein both receiving the acquired first sensor responses and receiving the acquired second sensor responses comprise using the Industrial Internet of Things (IIoT), and both controlling the valve group to the first position and controlling the valve group to the second position comprise using the IIoT.

8. The method of claim 5, further comprising:

acquiring, by the plurality of sensors, third sensor responses of the pipeline when a mixture of the first and second liquid hydrocarbon products is flowing through the pipeline following the first liquid hydrocarbon product and preceding the second liquid hydrocarbon product;

receiving, by the prediction circuit, the acquired third sensor responses;

integrating, by the prediction circuit, the received third sensor responses into one or more integrated third sensor responses in order to improve accuracy of the received third sensor responses; and identifying, by the prediction circuit, the mixture of the first and second liquid hydrocarbon products in the pipeline based on the integrated third sensor responses.

9. The method of claim 8, further comprising:

detecting, by the prediction circuit, a liquid product change in the pipeline based on the identified first liquid hydrocarbon product, the identified second liquid hydrocarbon product, and the identified mixture of the first and second liquid hydrocarbon products; and alerting, by the prediction circuit, an operator of the pipeline network about the detected liquid product change.

10. The method of claim 8, further comprising:

predicting, by the prediction circuit, a first arrival time of the first liquid hydrocarbon product at a group of one or more valves of the pipeline network based on the integrated first sensor responses, the valve group being for directing liquid hydrocarbon products in the pipeline network to their corresponding destinations;

controlling, by the prediction circuit, the valve group to a first position at the predicted first arrival time based on the identified first liquid hydrocarbon product;

predicting, by the prediction circuit, a third arrival time of the mixture of the first and second liquid hydrocarbon products at the valve group based on the integrated third sensor responses;

controlling, by the prediction circuit, the valve group to a third position at the predicted third arrival time based on the identified mixture of the first and second liquid hydrocarbon products, the third position being different than the first position;

predicting, by the prediction circuit, a second arrival time of the second liquid hydrocarbon product at the valve group based on the integrated second sensor responses; and controlling, by the prediction circuit, the valve group to a second position at the predicted second arrival time based on the identified second liquid hydrocarbon product, the second position being different than the first and third positions.

11. A system of automated pipeline sensor integration for liquid product mapping of a pipeline network, the system comprising:

a plurality of sensors configured to acquire first training sensor responses of a pipeline in the pipeline network when a first liquid hydrocarbon product is flowing through the pipeline, and to acquire first sensor responses of the pipeline when the first liquid hydrocarbon product is again flowing through the pipeline;

a prediction circuit; and a machine learning circuit configured to build the prediction circuit from the acquired first training sensor responses using a machine learning process, the prediction circuit being configured to:

receive the acquired first sensor responses;

integrate the received first sensor responses into one or more integrated first sensor responses in order to improve accuracy of the received first sensor responses; and identify the first liquid hydrocarbon product in the pipeline based on the integrated first sensor responses.

12. The system of claim 11, wherein the prediction circuit is further configured to:

detect a leak in the pipeline based on the integrated first sensor responses; and alert an operator of the pipeline network about the detected leak.

13. The system of claim 11, wherein the prediction circuit is further configured to:

predict a first arrival time of the first liquid hydrocarbon product at a group of one or more valves of the pipeline network based on the integrated first sensor responses, the valve group being for directing liquid hydrocarbon products in the pipeline network to their corresponding destinations; and control the valve group to a first position at the predicted first arrival time based on the identified first liquid hydrocarbon product.

14. The system of claim 11, wherein the prediction circuit is further configured to:

predict an arrival time of the first liquid hydrocarbon product at a location in the pipeline network based on the integrated first sensor responses; and alert an operator of the pipeline network about the predicted arrival time.

15. The system of claim 11, wherein the plurality of sensors are further configured to acquire second training sensor responses of the pipeline when a second liquid hydrocarbon product different than the first liquid hydrocarbon product is flowing through the pipeline, the machine learning circuit building the prediction circuit from the acquired first and second training sensor responses, and acquire second sensor responses of the pipeline when the second liquid hydrocarbon product is again flowing through the pipeline the flowing of the second liquid hydrocarbon product through the pipeline and corresponding to the acquired second sensor responses following the flowing of the first liquid hydrocarbon product through the pipeline and corresponding to the acquired first sensor responses, and wherein the prediction circuit is further configured to:

receive the acquired second sensor responses;

integrate the received second sensor responses into one or more integrated second sensor responses in order to improve accuracy of the received second sensor responses; and identify the second liquid hydrocarbon product in the pipeline based on the integrated second sensor responses.

16. The system of claim 15, wherein the prediction circuit is further configured to:

predict a first arrival time of the first liquid hydrocarbon product at a group of one or more valves of the pipeline network based on the integrated first sensor responses, the valve group being for directing liquid hydrocarbon products in the pipeline network to their corresponding destinations;

control the valve group to a first position at the predicted first arrival time based on the identified first liquid hydrocarbon product;

predict a second arrival time of the second liquid hydrocarbon product at the valve group based on the integrated second sensor responses; and control the valve group to a second position at the predicted second arrival time based on the identified second liquid hydrocarbon product, the second position being different than the first position.

17. The system of claim 16, wherein the prediction circuit is further configured to:

both receive the acquired first sensor responses and receive the acquired second sensor responses by using the Industrial Internet of Things (IIoT); and both control the valve group to the first position and control the valve group to the second position by using the IIoT.

18. The system of claim 15, wherein the plurality of sensors are further configured to acquire third sensor responses of the pipeline when a mixture of the first and second liquid hydrocarbon products is flowing through the pipeline following the first liquid hydrocarbon product and preceding the second liquid hydrocarbon product, and the prediction circuit is further configured to:

receive the acquired third sensor responses;

integrate the received third sensor responses into one or more integrated third sensor responses in order to improve accuracy of the received third sensor responses; and identify the mixture of the first and second liquid hydrocarbon products in the pipeline based on the integrated third sensor responses.

19. The system of claim 18, wherein the prediction circuit is further configured to:

detect a liquid product change in the pipeline based on the identified first liquid hydrocarbon product, the identified second liquid hydrocarbon product, and the identified mixture of the first and second liquid hydrocarbon products; and alert an operator of the pipeline network about the detected liquid product change.

20. The system of claim 18, wherein the prediction circuit is further configured to:

predict a first arrival time of the first liquid hydrocarbon product at a group of one or more valves of the pipeline network based on the integrated first sensor responses, the valve group being for directing liquid hydrocarbon products in the pipeline network to their corresponding destinations;

control the valve group to a first position at the predicted first arrival time based on the identified first liquid hydrocarbon product;

predict a third arrival time of the mixture of the first and second liquid hydrocarbon products at the valve group based on the integrated third sensor responses;

control the valve group to a third position at the predicted third arrival time based on the identified mixture of the first and second liquid hydrocarbon products, the third position being different than the first position;

predict a second arrival time of the second liquid hydrocarbon product at the valve group based on the integrated second sensor responses; and control the valve group to a second position at the predicted second arrival time based on the identified second liquid hydrocarbon product, the second position being different than the first and third positions.

21. The method of claim 1, wherein the first liquid hydrocarbon product comprises gasoline, diesel, or kerosene.

22. The system of claim 11, wherein the first liquid hydrocarbon product comprises gasoline, diesel, or kerosene.

* * * * *